Figure 1:
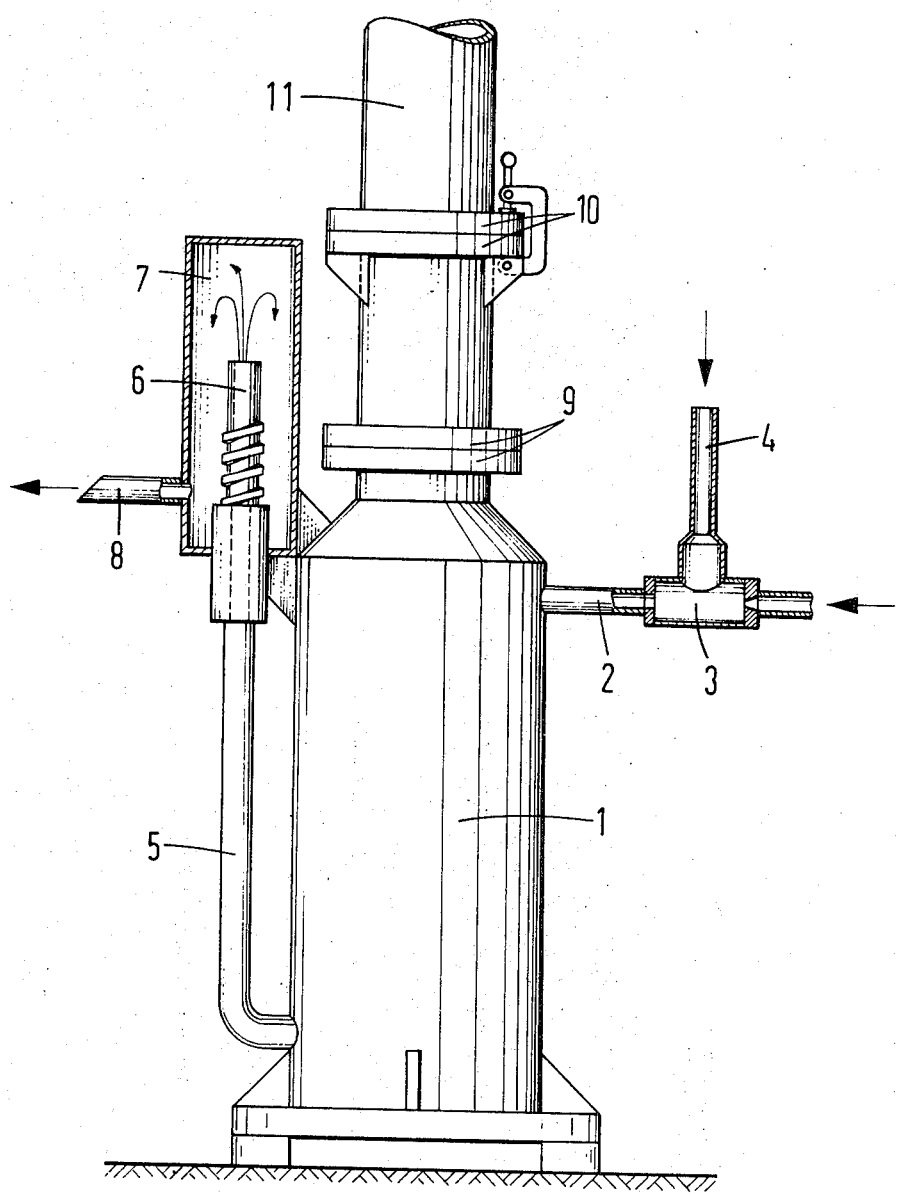

United States Patent [19]
Hückstedt et al.

[11] 3,772,192
[45] Nov. 13, 1973

[54] METHOD AND APPARATUS FOR PURIFYING SEA WATER

[75] Inventors: Guido Hückstedt, Starnberg; Hermann Jakobs, Seewiesen, both of Germany

[73] Assignee: Max-Planck-Gesellschaft, zur Forderung der Wissenchaften e.v., Gottingen, Germany

[22] Filed: Mar. 13, 1972

[21] Appl. No.: 234,161

[30] Foreign Application Priority Data
Mar. 15, 1971 Germany.................. P 21 12 401.6

[52] U.S. Cl.................. 210/44, 210/221, 209/170
[51] Int. Cl.............................................. B03d 1/00
[58] Field of Search........................... 210/44, 221; 209/170

[56] References Cited
UNITED STATES PATENTS
2,446,655   8/1948   Lawrason............................. 210/44
3,669,883   6/1972   Huckstedt........................... 210/44

Primary Examiner—Frank A. Spear, Jr.
Assistant Examiner—Thomas G. Wyse
Attorney—Kurt Kelman et al.

[57] ABSTRACT

Sea water contaminated with suspended organic matter and the like can be purified by expanding a mixture of the water with air so as to generate a froth, and letting the froth carrying the impurities overflow from a tubular riser attached to the expansion vessel while purified water is drawn off from the bottom of the vessel. The froth is stabilized by maintaining a layer of more alkaline liquid on the inner wall of the riser. The apparatus employed uses a rotating nozzle for continuously rinsing the wall of the riser with a liquid more alkaline than the froth, such as the original sea water prior to its being mixed with air.

9 Claims, 2 Drawing Figures

METHOD AND APPARATUS FOR PURIFYING SEA WATER

This invention relates to the purification of contaminated water, and particularly to a method of purifying sea water contaminated with ions of a heavy metal and/or suspended organic matter, and to apparatus for performing the method.

It is known to purify sea water in continuous flow by mixing the water with air in an amount sufficient to generate a froth which is enriched with the impurities to be removed, and to separate the froth from the remainder of the water, thereby purifying the latter. The procedure is closely related to the known method of ore concentration by flotation. Because of its salt content, sea water tends to froth or foam under the action of air even in the absence of surface active agents.

When trace amounts of suspended organic matter of relatively high molecular weight or minute amounts of heavy metal ions such as copper are present in the raw water, the froth accumulates the contaminants at the liquid-gas interface of the bubbles in the froth. The purifying effect is lost if the froth collapses or is otherwise disturbed. It is essential, therefore, properly to control all operating variables, such as the relative amounts of air and sea water, the air pressure, and the like, to keep the foam stable.

It has been found that it is difficult to maintain the required balance of process variables, and the amount of residual impurities in the recovered water rises in the known methods at such a rate as to make continuous water purification impractical.

It is the primary object of the present invention to modify the known method of water purification by froth separation so that it provides consistently favorable results in continuous operation.

Another important object is the provision of apparatus for performing the improved method.

It has now been found that foam generated from sea water in the manner described can be stabilized, and that water can be purified in continuous operation if the froth is continuously introduced into the bottom portion of a container bounded by upright walls and continuously removed from the top portion of the container while a concentration of negative charges greater than in said froth is maintained in the container adjacent the upright wall.

If this distribution of negative electric charges is maintained by rinsing the wall with a suitable liquid, and the liquid flows downward along the rinsed wall, the liquid has no harmful effect on the rinsing froth although moving in the opposite direction.

The froth generated by expanding a mixture of contaminated sea water and air is invariably more acid than the sea water originally fed to the purification apparatus and may thus be employed as the wall rinsing liquid. The decreased pH of aerated sea water is believed due to oxidation of such organic matter as protein in human excrements and in substances originating from dead animals and plants. The importance of using a rinsing liquid more alkaline than the froth is readily demonstrated by slightly acidifying the raw sea water which otherwise stabilizes the froth. The froth rapidly collapses in contact with the more acid rinsing liquid. It is stabilized by an amount of more alkaline raw water which is a very small fraction of the total water processed.

Apparatus suitable for performing the method may include an expansion vessel, a mixing device for intimately mixing the water to be purified with air, a feeding device for feeding the resulting mixture of water and air to the expansion vessel under a pressure higher than the pressure in the vessel, and an outlet on the bottom portion of the vessel for withdrawing purified water while maintaining a liquid level in the vessel. A tubular riser extends upwardly from the vessel, and the space enclosed therein communicates with the vessel for receiving the froth which is generated by expansion of the water/air mixture in the vessel and rises above the liquid level. The froth is released from a portion of the riser space remote from the expansion vessel in an upward direction. A rinsing device is provided for applying a film of liquid to an inner face of the riser while keeping the remainder of the space in the riser substantially free from the liquid.

Figure 2:
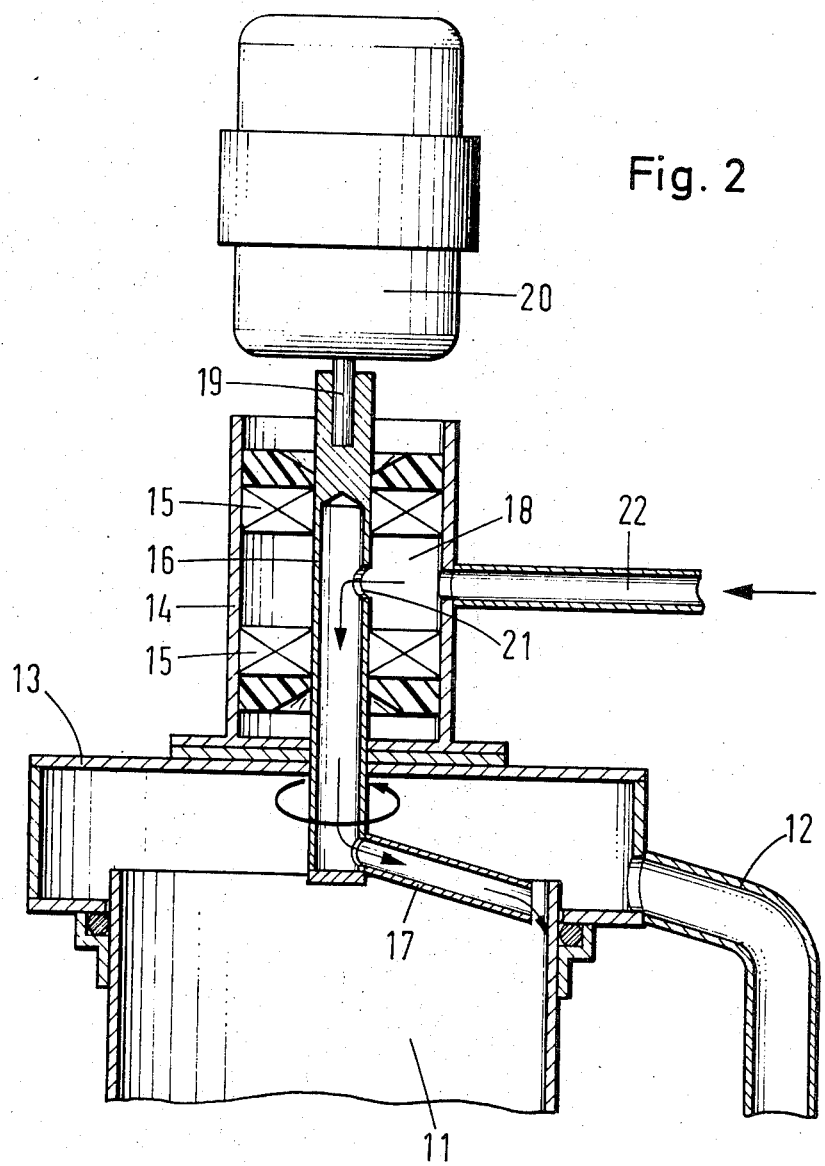

Additional features, other objects, and many of the attendant advantages of this invention will readily become apparent from the following detailed description of a preferred apparatus of the invention and of the operation of this apparatus when considered in connection with the appended drawing in which:

FIG. 1 shows the apparatus in fragmentary side elevation and partly in section; and FIG. 2 shows the portion of the apparatus omitted from FIG. 1 in elevational section on a larger scale.

Referring now to the drawing in detail, and initially to FIG. 1, there is seen an upright, cylindrical expansion vessel 1. A feed pipe 2 connects the top portion of the vessel 1 with a water jet pump 3, conventional in itself, which draws ambient atmospheric air through an intake 4 and mixes it with a stream of water supplied under adequate pressure by a non-illustrated pump. The suction pipe of the pump is connected to a source of the sea water to be purified in a manner not illustrated since entirely conventional.

The liquid level in the expansion vessel 1 is maintained by an outlet pipe 5 extending upward from the bottom portion of the vessel 1 and terminating in a nozzle 6 at its upper, free end. The nozzle 6 is threadedly mounted in the wall of a chamber 7 which spacedly envelops the nozzle 6 to catch liquid sprayed from the nozzle and is open to the atmosphere through a spout 8.

The top end of the expansion vessel 1 tapers conically to a coaxial tubular riser 11 consisting of several axial sections which are attached to the vessel 1 and to each other by flanges 9, 10. The top end of the riser 11, shown in FIG. 2, is provided with a cover 13 from which an overflow pipe 12 may release material to the atmosphere or a collecting tank.

A hollow cylinder 14 coaxial with the riser 11 and the vessel 1 extends upward from the cover 13. Two sealed bearings 15 are axially spaced in the cylinder 14 and sealingly receive a tubular member 16 for coaxial rotation in the cylinder 14. The member 16 is axially sealed at the top and bottom, but has two lateral orifices.

One of the orifices at the bottom end of the tubular member 16 in the space within the riser 11 is sealingly engaged by a nozzle 17. The nozzle is a tube extending obliquely from the lower orifice of the member 16 in a radial and downward direction. The free, open end of the nozzle 17 is located closely adjacent the overflow edge of the riser 11 in the cover 13, and is downwardly offset from the edge a very small distance.

The other lateral orifice 21 of the member 16 communicates outside the riser space with a chamber 18 axially bounded in the cylinder 14 by the two bearings 15. A supply pipe 22 is connected with the chamber 18 as far as illustrated, and the non-illustrated end of the pipe 22 draws raw sea water from the pump, not shown, which feeds water to the water jet pump 3.

The upper, closed end of the tubular member 16 is fastened to the output shaft 19 of a gear motor 20 mounted on nonillustrated supporting structure. When the drive motor 20 is energized, the tubular member 16 is turned about its axis as indicated by a curved arrow, and the free, open end of the nozzle 17 sweeps along the inner wall face of the riser 11 in a continuous arc.

During operation of the illustrated device, a continuous, thin film of relatively alkaline sea water is maintained on the inner wall face of the riser 11 by the rotating nozzle 17 whose water supply is suitably controlled by a non-illustrated valve in the pipe 22.

The pressure of the water entering the jet pump 3 is similarly controlled to raise the pressure of the water/air mixture fed to the vessel 1 through the pipe 2 well above the atmospheric or near-atmospheric pressure in the expansion vessel. The air bubbles in the intimate water/air mixture expand in the vessel 1 so that a froth forms continuously on the liquid surface, the earlier formed froth being pushed upward by froth newly formed in the water entering the vessel 1 through the feed pipe 2 and withdrawn from the vessel through the outlet pipe 5 with a much smaller air content and stripped of a significant portion of its impurities.

Because of chemical interaction between the oxygen in the air drawn into the water jet pump 3 and the impurities in the water, the froth is of significantly lower pH value than the raw sea water which wets the inner walls of the riser 11. The more alkaline film on the walls substantially increases the stability of the froth so that the apparatus illustrated, when once adjusted for adequate water pressure in the water jet pump 3, can be run continuously and continuously removes the impurities in the sea water with the froth released through the overflow pipe 12. Purified water is discharged from the spout 8.

If the nature of the contaminated water is sufficiently different from that of sea water as not to be acidified by the action of the admixed air, the more alkaline film of liquid on the inner surfaces of the riser may be provided in any other desired manner, as by connecting the supply pipe 22 to a tank containing very dilute sodium carbonate solution.

As is inherent in the described mode of operation, devices other than the nozzle arrangement of FIG. 2 may be employed for maintaining a higher concentration of negative charges adjacent the inner face of the riser 11 than prevails in the froth, and the nozzle arrangement thus will be understood to be merely exemplary of suitable apparatus. Provisions, of course, must be made not to let the more alkaline liquid permeate the froth.

It will be understood, therefore, that the foregoing disclosure relates only to preferred embodiments of the invention and that is is intended to cover all changes and modifications of the example of the invention herein chosen for the purpose of the disclosure which do not constitute departures from the spirit and scope of the invention set forth in the appended claims.

We claim:

1. A method of purifying contaminated raw water which comprises:
   a. mixing a flowing body of said water with an amount of air sufficient to cause formation of a froth on the surface of said water;
   b. continuously introducing said froth into the bottom portion of a container bounded by an upright wall;
   c. continuously removing said froth from a top portion of said container;
   d. rinsing said wall with a liquid having a pH value higher than the pH value of said froth in an amount sufficient to maintain in said container adjacent said wall thereof a concentration of negative electric charges greater than the concentration of negative electric charges in said froth; and
   e. recovering the water separated from said froth.

2. A method as set forth in claim 1, wherein said raw water is sea water contaminated with ions of a heavy metal, said ions accumulating in said froth and being removed therewith from said water.

3. A method as set forth in claim 1, wherein said raw water is sea water contaminated with suspended organic matter, said organic matter accumulating in said froth and being removed therewith from said water.

4. A method as set forth in claim 1, wherein said liquid is constituted by a portion of said raw water free from said air.

5. Water purification apparatus comprising, in combination:
   a. an expansion vessel;
   b. mixing means for intimately mixing the water to be purified and air;
   c. feeding means for feeding the resulting mixture of water and air to said expansion vessel under a pressure higher than the pressure in said vessel, whereby said mixture expands in said vessel;
   d. outlet means on a bottom portion of said vessel for withdrawing purified water from said vessel while maintaining a liquid level in said vessel;
   e. a tubular riser upwardly extending from said vessel and enclosing a space, said space communicating with said vessel for receiving froth generated by expansion of said mixture in said vessel, said froth rising above said level;
   f. releasing means for releasing said froth from a portion of said space upwardly remote from said vessel; and
   g. rinsing means for applying a film of liquid to an inner face of said riser while keeping the remainder of said space substantially free from said liquid.

6. Apparatus as set forth in claim 5, wherein said rinsing means include a nozzle member directed toward a portion of said inner face contiguously adjacent said releasing means and offset from the same toward said level.

7. Apparatus as set forth in claim 6, wherein said riser has an upright axis, said inner face extends about said axis, and said rinsing means include rotating means for rotating said nozzle member about said axis and for thereby sequentially directing said liquid to portions of said inner face angularly offset relative to said axis.

8. Apparatus as set forth in claim 7, wherein said rotating means include a tubular member elongated in the direction of said axis, drive means for rotating said tubular member about said axis, said tubular member having respective orifices in said space and outside said space, said nozzle member being attached to said tubular member in sealing engagement with the orifice of the tubular member in said space, and means for supplying said liquid to the orifice of said tubular member outside said space.

9. Apparatus as set forth in claim 5, wherein said mixing means include a water jet pump and means for connecting said water jet pump to a source of the water to be purified and to ambient air, said feeding means connecting said pump to said expansion vessel.

* * * * *